Nov. 19, 1929.                    W. E. WINE                    1,736,476
                                  SIDE BEARING
                              Filed March 8, 1927                2 Sheets-Sheet 1
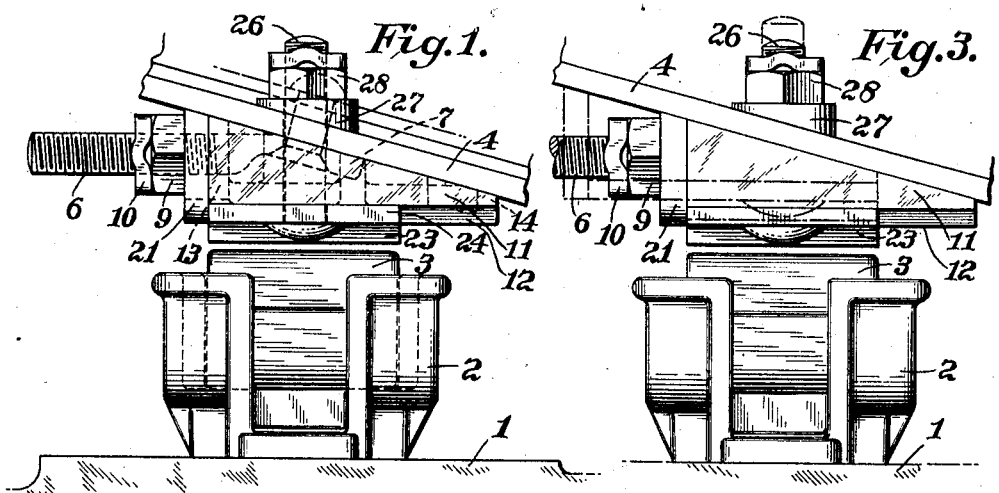
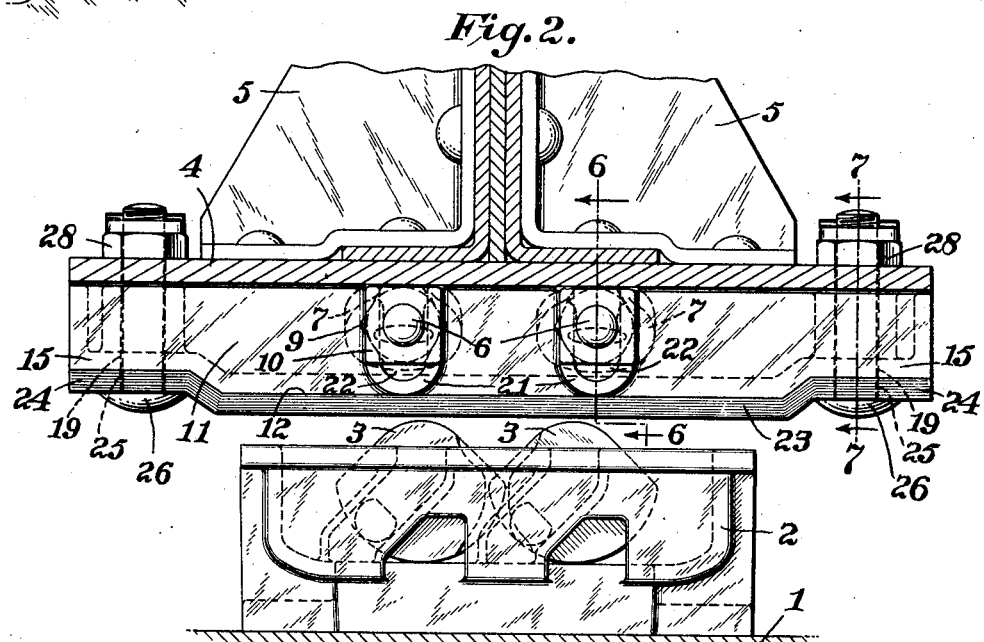
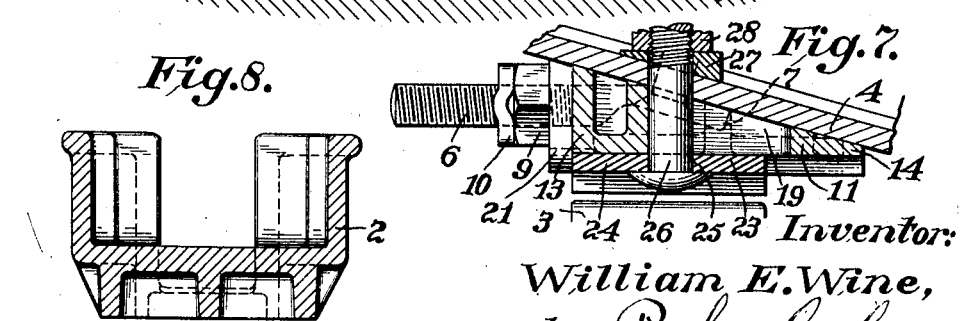
Inventor:
William E. Wine,
by Parker Cook
           Atty.

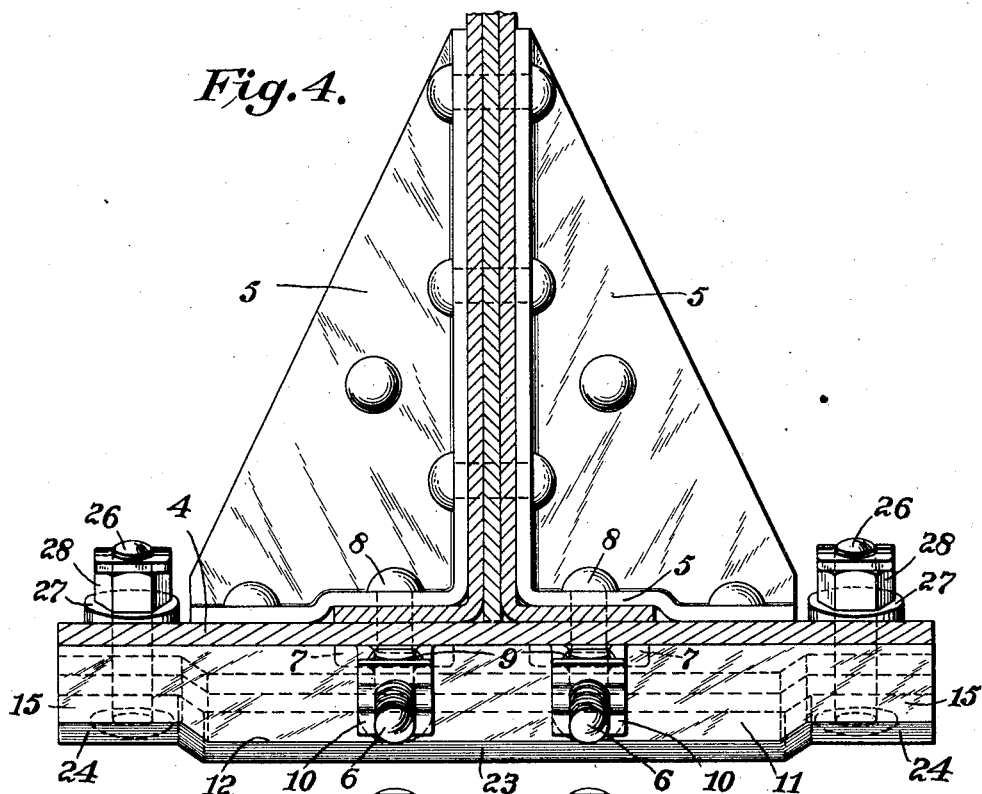
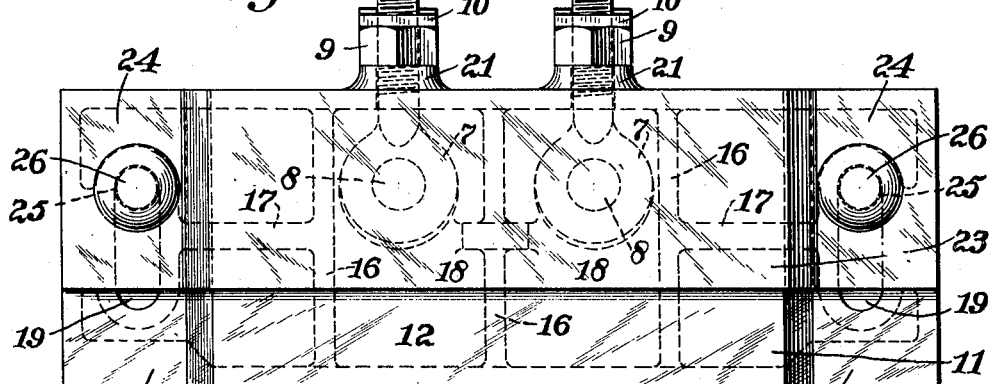

Patented Nov. 19, 1929

1,736,476

UNITED STATES PATENT OFFICE

WILLIAM E. WINE, OF TOLEDO, OHIO

SIDE BEARING

Application filed March 8, 1927. Serial No. 173,735.

My invention relates to new and useful improvements in side bearing and particularly to that part of the bearing known as the body bearing.

The present application is a companion case to three other applications filed by me on side bearings as follows:—

Filed February 23, 1927, Serial No. 170,389,

Filed March 1, 1927, Serial No. 171,758,

Filed March 2, 1927, Serial No. 172,067.

The present application has to do with a side bearing, wherein the body bearing portion is attached to the opposite ends of the bolster and wherein the body bearing consists of a wedge-shaped member in cross section, having means for adjusting the wedge-shape portion within certain limits up and down the slope of the bolster.

The present application differs from the other three however, in that the wear plate is not riveted to the wedge-shaped member, but on the other hand the wedge is movable with relation thereto, so that by moving the wedge member up and down the bolster beneath the wear plate, the latter may be raised or lowered with relation to the truck bearing. After the wear plate is adjusted, it will be tightly clamped to the body bolster and helps hold the wedge-shape member in place.

Still another object of the invention is to provide a side bearing wherein the body bearing consists of a wedge-shape member and a wear plate, which latter, is clamped about the wedge-shape member and then tightly clamped to the body bolster.

As is well known to those skilled in the art, it is desirable at times to adjust one of the two parts of the side bearing, that is the truck bearing or the body bearing, due to the fact that the body bolster may sag or the center plate may be slightly irregular. The present invention has to do with a simple manner of adjusting the body bearing with relation to the truck bearing.

With these and other objects in view, the invention consists in certain new and novel arrangements and combination of parts, as will be hereinafter more fully described and pointed out in the claims.

Referring now to the drawings showing a preferred embodiment of the invention,

Fig. 1 is an end elevation showing the body bearing and truck bearing in position, a fragmentary portion of both the truck and the bolster being shown, Fig. 2 is a side view with a part of the body bolster being shown in section, Fig. 3 is a view similar to Fig. 1 and showing the limits of adjustment of the body bearing, Fig. 4 is a vertical sectional view taken on a line with the incline of the body bolster, Fig. 5 is a bottom plan view of the body bolster bearing member, Fig. 6 is a transverse sectional view taken on line 6—6 of Fig. 2 looking in the direction of the arrows, Fig. 7 is a sectional view at one end of the body bolster and taken on line 7—7 of Fig. 2 and Fig. 8 is a transverse sectional view of the housing of the truck bearing.

Referring now more particularly to the several views and for the moment to Fig. 1, there is shown a portion 1 of a truck on which is mounted the housing 2, with the rollers 3 therein, this truck bearing illustrated, being of the well known "Wine" type and shown in a co-pending application filed by me on the 15th day of March, 1926, and bearing Serial No. 94,751.

It might be mentioned at this point, however, that any desirable form of truck bearing might be used in cooperation with the body bearing and I do not wish to be limited in any manner to the form of truck bearing shown.

It might also be understood that although I have not shown the bolts for fixedly securing the housing of the truck bearing to the truck, this housing is supposed to be tightly bolted or otherwise secured to the truck.

Referring now more particularly to the gist of the invention, there is shown a fragmentary portion of a body bolster 4, and it will be understood that most of the bolsters in use today are provided with sloping opposite side portions. In Fig. 4, there is shown the reinforcing plates 5 that are a part of the bolster and are located directly over the side bearings to take up the stresses and strains at these points.

It might be well at this point to refer to Fig. 6 where it wil be seen that there is riveted to the underside of the body bolster 4 the bolt 6, which has its inner end 7 flattened and countersunk for the reception of the rivet 8, which rivet passes through the body bolster and the flange of the reinforcing plate 5.

It will be understood that there are two of these bolts 6, as Fig. 6 is a transverse section and of course each of the bolts is provided with a nut 9 and a lock washer or nut 10.

The inner ends of these bolts are riveted directly above the rollers 3 that are within the housing 2.

Referring now to the other figures, there is seen a casting 11, which is in the shape of a wedge in cross section, that is, it is provided with a flat base 12, while its upper or inner surface is inclined, due to the fact that one wall 13 is much higher than the opposite wall 14.

The incline of this wedge on its upper surface, corresponds to the natural incline of the under surfaces of the body bolster 4, so that whether this casting is moved downwardly or upwardly of the inclined bolster 4, the base always remains parallel with the upper surface of the rollers 3.

This casting 11 has the projecting wings or extensions 15 at its opposite ends and the said wings are in a slightly elevated plane to that of the natural base 12, as may be seen in Figs. 2 and 5, as well as in several of the other figures.

This casting is provided with the internal cross ribs 16, as well as with the longitudinal ribs 17, to strengthen the casting but these horizontal ribs 17 do not extend completely lengthwise of the casting, as it is desirable to have the two pockets or chambers 18 within which rest the flattened ends 7 of the bolts 6 and so that the casting 11 may be moved inwardly and outwardly with relation to these bolts 6 as will be shortly explained.

These two wings 15 are also provided with the respective slots 19, as may be seen in Fig. 5, the slots extending transversely of the wings.

The high wall 13 is provided centrally with two bosses 21, which in turn reinforce the vertical U slots 22.

After the bolts 6 have their inner ends 7 riveted to the body bolster 4, the casting 11 will be placed up against the body bolster, so that the inner ends 7 of the bolts 6 will be within the chambers 18 of the casting and the threaded portion of the bolts 6 will extend through the slots 22 and outwardly beyond the bosses, as may be seen in Fig. 1.

Now to hold this casting in a set position, I form the hardened wear plate 23, with the off-set ends 24, while the several planes on the inner surface of this wear plate conform to the several outer surfaces of the casting and in the two ends of the wear plate I drill the respective holes 25.

Through each of these holes is passed the respective bolts 26 and in turn pass through the slots 19 and through holes in the bolster, while on the inner surface of the bolster are placed the inclined washers 27, so that the nut 28 may be pulled down on the washers 27 to thus clamp the wear plate of the casting and in turn the casting to the body bolster.

It will be noticed in Fig. 5 that the wear plate is narrower in width than the width of the casting and in this way I am able to save a good deal of metal for the hardened wear plate so in the manufacture of thousands of bearings, it means a considerable saving.

Now the adjustment of the clearance between the wear plate and the rollers is exceedingly simple.

In Fig. 3 there is shown the opposite limits and supposing it is desired to raise the wear plate; first, the nuts 28 would be loosened on the bolts 26 to loosen the wear plate and the casting with respect to the body bolster, after which the lock nuts 9 and 10, on the bolts 6, would be backed off and the casting 11 moved upwardly, Fig. 6, to the desired distance. Then the nuts on the bolts 26 would again be drawn up and as the wedge or casting has been moved, the transverse distance between the wear plate and the body bolster would be lessened, so that the wear plate then would be elevated with relation to the upper surface of the rollers. The nuts 9 and 10 would be secured in place and the body bearing would not need further adjustment until after many months of use.

From the aforegoing, it will be seen that the bearing is exceedingly simple in construction and that to adjust the wear plate with relation to the truck bearing, it is simply necessary to loosen two nuts passing through the body bolster and to back off two nuts on the adjusting bolts and then slide the casting upwardly or downwardly and transversely of the wear plate as desired and again lock the several nuts in position.

By providing an adjusting arrangement of this kind, the correct clearance between the wear plate and the truck bearing may be kept at all times.

Furthermore, a saving in material of the wear plate may be had while the wear plate also acts to clamp the movable wedge shape casting tightly to the bolster.

The wear plate always remains directly over the rollers as it does not move laterally but is adjustable vertically, only.

Many slight changes might be made, without in any way departing from the spirit and scope of the invention.

Having thus described the same what I claim as new and desire to secure by Letters Patent is:

1. A side bearing comprising a body bearing adapted to be secured to a body bolster, a wear plate having off-set ends and bolts for clamping the wear plate at its ends to the body bolster, rolls secured to said body bolster and extending at an acute angular relation therefrom, a wedge shape member extending transversely between the body bolster and the wear plate, said wedge-shape member capable of being moved inwardly and outwardly of said tangential bolts to thereby vertically adjust the said wear plate.

2. A side bearing comprising in part two bolts secured to a body bolster and extending at an acute angular relation therefrom, a wedge shape casting provided with slots in its rear wall and partly enclosing said bolts, a wear plate partly enclosing said casting and means for clamping the wear plate and the wedge-shape member to the body bolster after the wedge shape member has been adjusted along said bolts and means on said bolts for also locking the wedge-shape member in position.

3. A side bearing comprising a truck bearing and a body bearing, the body bearing comprising a vertically adjustable wear plate, an adjustable wedge adapted to fit between the wear plate and the body bolster, and the wear plate partly encircling and clamping the wedge throughout its length, means secured to the body bolster and fitting partly within said wedge-shape member for transversely adjusting the wedge-shape member and bolts for clamping the wear plate and wedge-shape member in a desired set position.

4. A side bearing comprising a truck bearing and a body bearing, bolts having one end adapted to be tangentially secured to the body bolster, a wedge-shape casting adjustable along said bolts and capable of being locked transversely, a wear plate having off-set ends supporting said wedge and means at the opposite ends of the wear plate for clamping the wear plate and wedge to the body bolster.

5. A side bearing comprising in part a body bearing, said body bearing comprising a wedge shape member having slightly offset wings and provided with transverse slots in said wings, a wear plate of less width than the said wedge-shape member and provided with like wings at its ends and a hole in each of said wings, bolts flattened at one end and secured to the body bolster, said bolts extending within said wedge shape member, means for adjusting the wedge shape member along said bolts and further bolts extending through the holes and slots in the respective wings to thereby allow a movement of the wedge-shape member with regard to the wear plate and said bolts also clamping the wedge-shape member and wear plate to the body bolster.

6. A side bearing comprising in part a body bearing, said body bearing in the shape of a wedge and having wings at its opposite ends provided with slots, the said rear wall also provided with slots and bolts adapted to pass within said slots and be secured to a body bolster to adjust the said wedge-shape member within certain limits on the said body bolster, a wear plate in the form of a partly encircling clamp and means extending through the wear plate and the wedge-shape member for clamping the said parts to the body bolster.

7. A side bearing comprising a wedge adapted to be adjusted along a car bolster, the said wedge being off-set at its opposite ends and a wear plate also off-set at its opposite ends and adapted to clamp the wedge in a set position and means for locking the several parts in their set position.

8. A side bearing comprising a wedge and means adapted to lock the wedge against a bolster, a wear plate in the form of a clamp extending transversely to the incline of the wedge, the opposite ends of the wedge and the opposite ends of the clamp being offset and lockable against the bolster to hold the wedge and the clamp in an adjusted position.

9. A side bearing comprising a wear plate in the form of a clamp, a wedge lockable with the clamp and bolster, the said wear plate and said wedge having offset ends, means comprising bolts at the opposite ends of the clamp and wedge for holding the parts in a set position and supplemental means riveted to the slanting face of the bolster for also holding the wedge within certain limits within the clamp.

In testimony whereof I affix my signature.
WILLIAM E. WINE.